(12) United States Patent
Hui et al.

(10) Patent No.: US 10,310,944 B2
(45) Date of Patent: Jun. 4, 2019

(54) PHASED NETWORK FORMATION FOR POWER RESTORATION

(71) Applicant: Cisco Technology, Inc., San Jose, CA (US)

(72) Inventors: Jonathan W. Hui, Belmont, CA (US); Jean-Philippe Vasseur, Saint Martin d'uriage (FR); Wei Hong, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/696,851

(22) Filed: Sep. 6, 2017

(65) Prior Publication Data

US 2017/0364409 A1 Dec. 21, 2017

Related U.S. Application Data

(62) Division of application No. 14/567,346, filed on Dec. 11, 2014, now Pat. No. 9,785,509.

(Continued)

(51) Int. Cl.
| | |
|---|---|
| *G06F 11/14* | (2006.01) |
| *G06F 11/07* | (2006.01) |
| *G06F 15/16* | (2006.01) |
| *H04L 12/751* | (2013.01) |
| *H04L 12/703* | (2013.01) |

(Continued)

(52) U.S. Cl.
CPC ...... *G06F 11/1415* (2013.01); *G06F 11/0709* (2013.01); *G06F 11/0793* (2013.01); *H04L 45/02* (2013.01); *H04L 45/28* (2013.01); *G06F 11/1469* (2013.01); *G06F 2201/805* (2013.01); *H04L 43/06* (2013.01); *H04L 45/48* (2013.01); *H04L 49/00* (2013.01); *H04L 69/40* (2013.01)

(58) Field of Classification Search
CPC ......... H04L 45/02; H04L 45/28; H04L 45/48; H04L 69/40; H04L 43/06; H04L 49/00; H04B 1/713; H04W 40/246; G06F 11/1469; G06F 11/1415; G06F 11/0793; G06F 11/0709; G06F 2201/805
USPC ................................. 370/254, 256; 709/222
See application file for complete search history.

(56) References Cited

U.S. PATENT DOCUMENTS

| 6,963,285 B2 | 11/2005 | Fischer et al. |
|---|---|---|
| 7,715,309 B2 | 5/2010 | Scholl et al. |

(Continued)

FOREIGN PATENT DOCUMENTS

WO 2010/027495 A1 3/2010

OTHER PUBLICATIONS

Gnawali et al., "The Minimum Rank with Hysteresis Objective Function", Request for Comments 6719, Sep. 2012, 13 pages, Internet Engineering Task Force Trust.

(Continued)

*Primary Examiner* — Jungwon Chang
(74) *Attorney, Agent, or Firm* — Behmke Innovation Group LLC; James Behmke; Stephen D. LeBarron

(57) ABSTRACT

In one embodiment, a device receives a router advertisement message after a power outage event in a network. The device joins the network, in response to receiving the router advertisement message. The device sends a power restoration notification message via the network. The device selectively delays a disconnected node from joining the network.

9 Claims, 19 Drawing Sheets

Related U.S. Application Data

(60) Provisional application No. 62/076,752, filed on Nov. 7, 2014.

(51) Int. Cl.
  *H04L 12/26* (2006.01)
  *H04L 12/931* (2013.01)
  *H04L 29/14* (2006.01)
  *H04L 12/753* (2013.01)

(56) References Cited

U.S. PATENT DOCUMENTS

| | | |
|---|---|---|
| 2003/0236905 A1 | 12/2003 | Choi et al. |
| 2005/0102384 A1 | 5/2005 | Ueno et al. |
| 2009/0013210 A1 | 1/2009 | McIntosh et al. |
| 2009/0034433 A1 | 2/2009 | Chegaray et al. |
| 2009/0116412 A1* | 5/2009 | Yanagihara .......... H04L 12/185 370/256 |
| 2010/0074140 A1* | 3/2010 | Markham .............. H04L 45/02 370/254 |
| 2013/0028295 A1* | 1/2013 | Hui ....................... H04B 1/713 375/135 |

OTHER PUBLICATIONS

Thubert P., "Objective Function Zero for the Routing Protocol for Low-Power and Lossy Networks (RPL)", Request for Comments 6552, Mar. 2012, 14 pages, Internet Engineering Task Force Trust.

Vasseur et al., "Routing Metrics Used for Path Calculation in Low-Power and Lossy Networks", Request for Comments 5551, Mar. 2012, 30 pages, Internet Engineering Task Force Trust.

Winter et al., "RPL: IPv6 Routing Protocol for Low-Power and Lossy Networks", Request for Comments 6550, Mar. 2012, 157 pages, Internet Engineering Task Force Trust.

International Search Report and Written Opinion dated Feb. 3, 2016 in connection with PCT/US2015/059396.

* cited by examiner

PHASED NETWORK FORMATION FOR POWER RESTORATION

RELATED APPLICATIONS

This application is a Divisional application of U.S. patent application Ser. No. 14/567,346, filed on Dec. 11, 2014, the entire content of which is incorporated herein. This application claims priority to U.S. Provisional Application No. 62/076,752, filed Nov. 7, 2014, entitled: "PHASED NETWORK FORMATION FOR POWER RESTORATION," by Hui et al., the contents of which are herein incorporated by reference.

TECHNICAL FIELD

The present disclosure relates generally to computer networks, and, more particularly, to phased network formation for power restoration.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

In contrast to many traditional computer networks, LLN devices typically communicate via shared-media links. For example, LLN devices that communicate wirelessly may communicate using overlapping wireless channels (e.g., frequencies). In other cases, LLN devices may communicate with one another using shared power line communication (PLC) links. For example, in a Smart Grid deployment, an electric utility may distribute power to various physical locations. At each location may be a smart meter that communicates wirelessly and/or using the electrical power distribution line itself as a communication medium.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
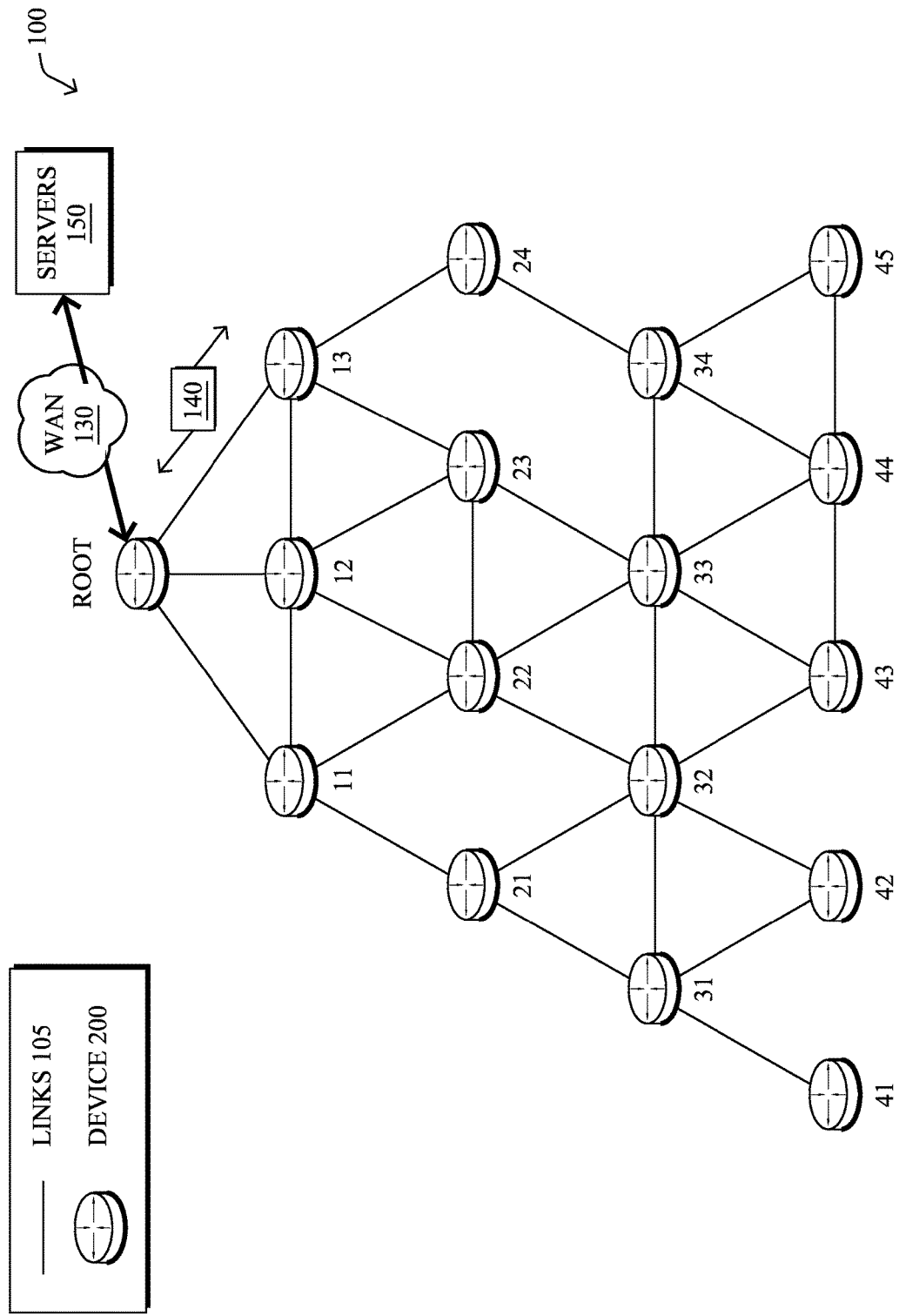
FIG. 1 illustrates an example communication network.

According to one or more embodiments of the disclosure, a device receives a router advertisement message after a power outage event in a network. The device joins the network, in response to receiving the router advertisement message. The device sends a power restoration notification message via the network. The device selectively delays a disconnected node from joining the network.

In further embodiments, a device in a network provides a first instruction to a first node in the network that causes the first node to delay a disconnected node from joining the network. The device determines whether formation of the network should continue being delayed. The device provides a second instruction to the first node that causes the first node to stop delaying the disconnected node from joining the network, based on a determination that formation of the network should no longer be delayed.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE 1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. The illustrative root node, such a field area router (FARs), may interconnect the local network with a WAN 130, via which the root node may communicate with one or more other relevant devices such as management devices or servers 150, e.g., a network management server (NMS), a dynamic host configuration protocol (DHCP) server, a constrained application protocol (CoAP) server, a power outage management system (OMS), etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
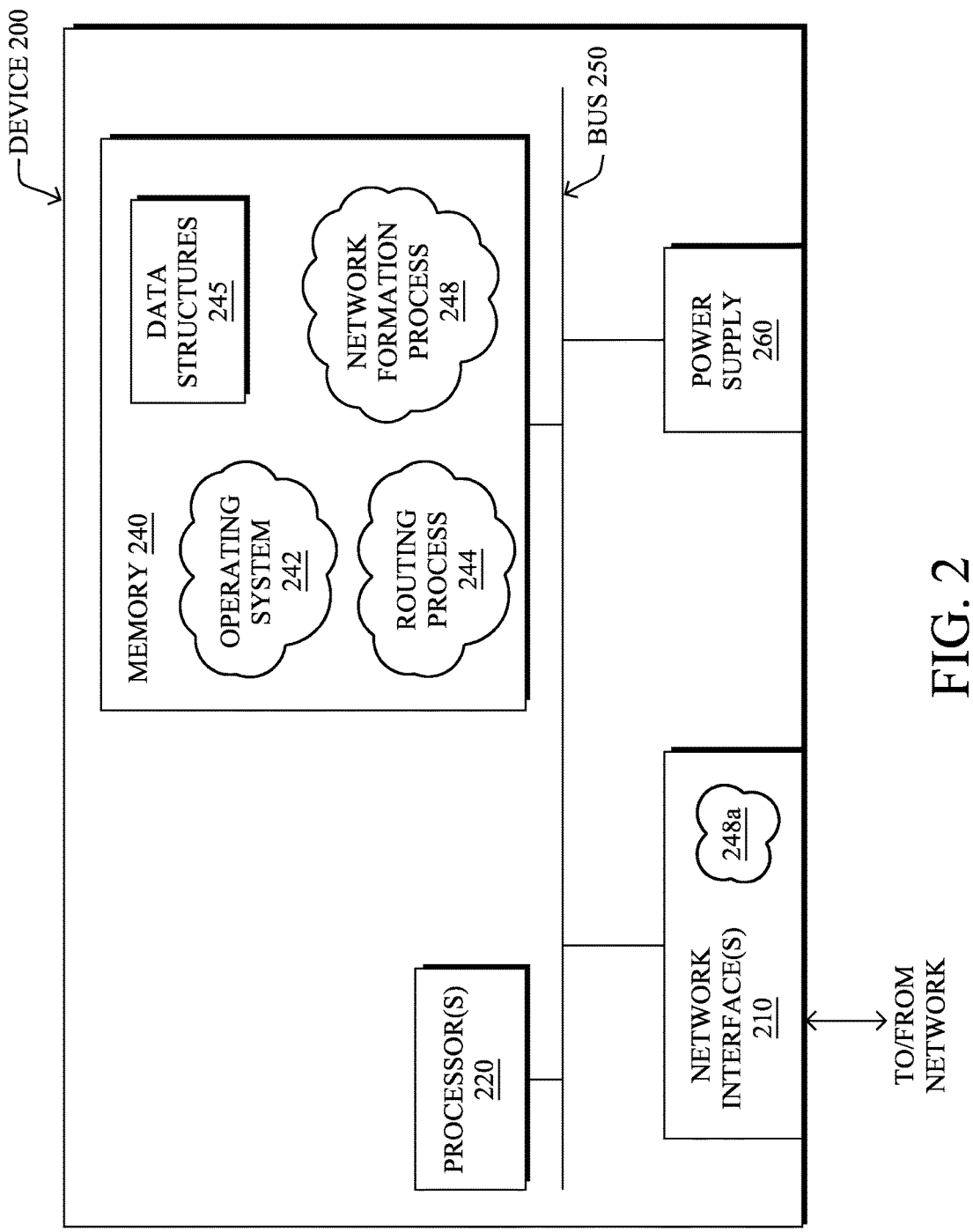
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and an illustrative network formation process 248, as described herein. Note that while process 248 is shown in centralized memory 240, alternative embodiments provide for the process to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by routing process 244) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks" <RFC 6551> by Vasseur, et al. (March 2012 version). Further, an example OF (e.g., a default OF) may be found in an IETF RFC, entitled "RPL Objective Function 0" <RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
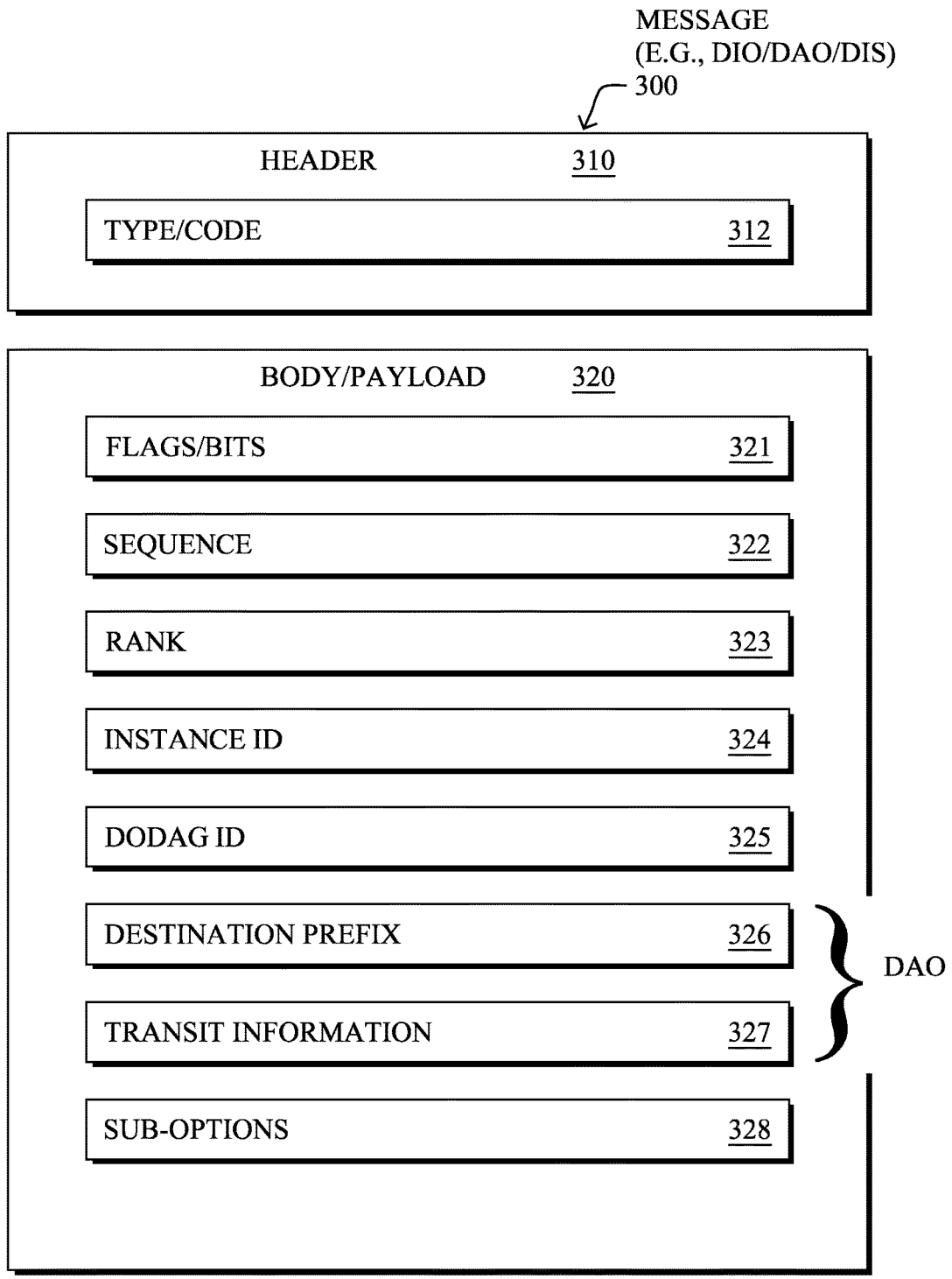
FIG. 3 illustrates an example routing protocol message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
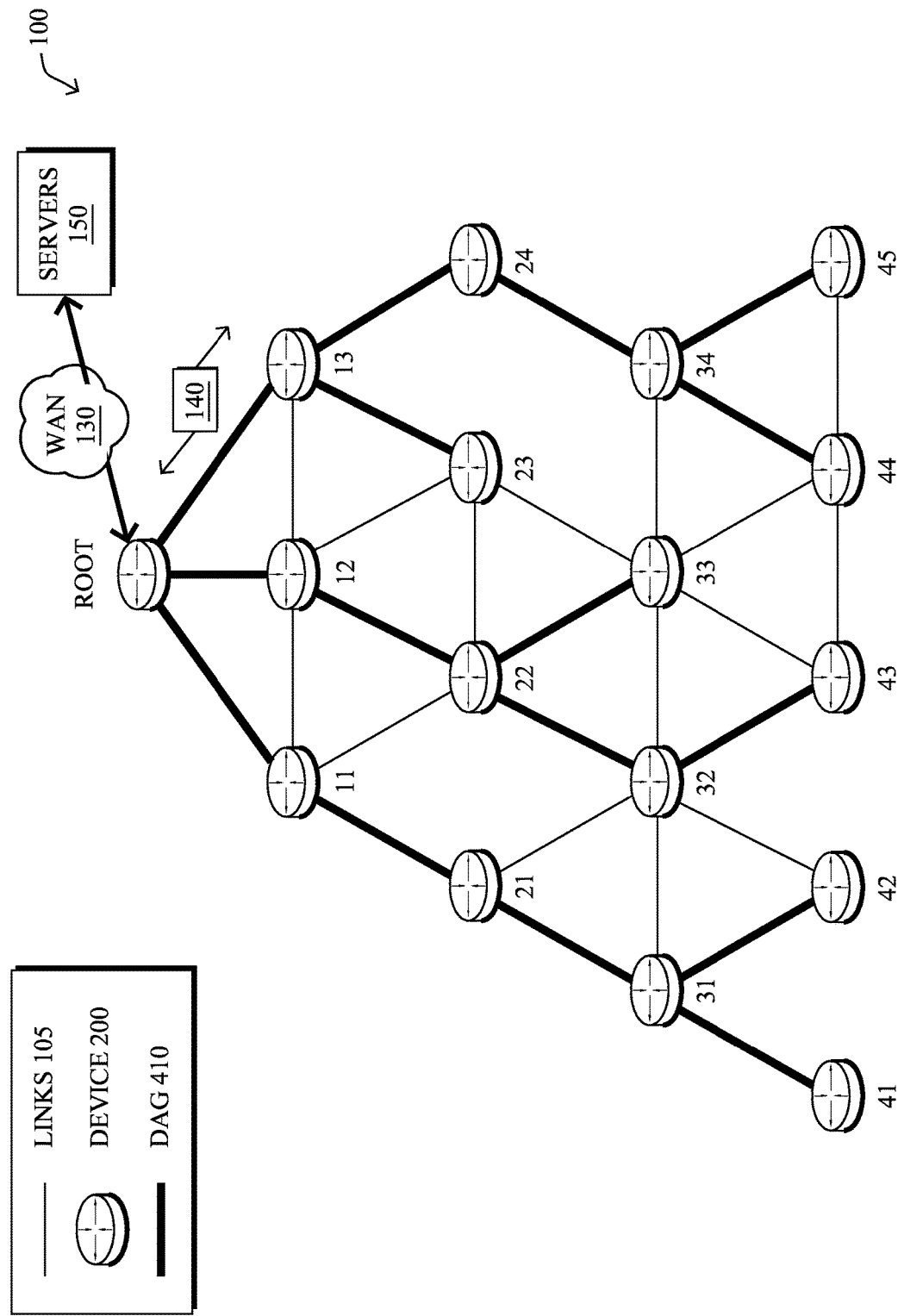
FIG. 4 illustrates an example directed acyclic graph (DAG) in the network.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

One event that may trigger a new network formation is a power outage/retoration event. In some cases, an IoT network may use Power Outage Notification (PON) and corresponding Power Restoration Notification (PRN) messages, to convey information about such an event. In general, PONs allow a utility to determine the occurrence and location of power outages. Similarly, PRNs allow a utility to determine when and where power is restored. For example, a power outage management system (OMS) (e.g., in servers 150) may analyze PONs and PRNs, to determine the current state of the power grid and, if necessary, initiate repairs.

Ideally, a mesh network would deliver 100% of PONs/PRNs within seconds of the actual event. Having 100% of the reports allows utilities to pinpoint exactly where power outages and restorations occur. Having minimal latency allows utilities to quickly act on a power outage or restoration event. PRNs following PONs are also useful to help determine the power outage duration (e.g., momentary, temporary, or sustained). PRNs may also be used to prevent unnecessary truck rolls that may be triggered by PONs (e.g., the deployment of repair technicians). PRNs may further provide real-time feedback when working to restore power in the field. In particular, when power is being restored to a service area, the field team needs to determine if their job is done or whether a nested outage exists and more works needs to be done in a different but nearby area. However, the practical constraints of mesh networking solutions are such that that the ideal world of PONs and PRNs cannot be met. Notably, 100% of PONs cannot be delivered since the vast majority of LLN devices do not have battery backup systems. In addition, 100% of PRNs also cannot be delivered within seconds of the restoration event due to channel capacity limitations that are typical in LLNs.

Typically, one of two mechanisms may be used to provide PRNs. The first is a link-layer broadcast that occurs after the device joins a network at the link layer, allowing any neighboring devices that have full network connectivity to forward the PRN to an OMS. The second is a unicast PRN that is delivered once the device itself has discovered a default route and obtained an IPv6 address and/or any other necessary network-layer configurations. While the first mechanism can provide relatively low-latency PRNs via link-layer broadcasts, it does not support the detection of nested outages well. In addition, these approaches require all devices at the perimeter of the power restoration area to fully join the network before the next layer of devices can broadcast their PRNs. While the second mechanism generally provides 100% PRN reporting reliability, it doesn't address the latency requirement because the network must go through the normal network formation process.

An OMS used by a utility to detect and mitigate power outages may be configured to operate with imperfect information. In particular, an OMS has knowledge of the electric distribution network (e.g., information regarding the power grid itself) and may be operable to accurately pinpoint the location and extent of power outages/restorations with only a subset of the PONs/PRNs received from the affected devices. As a result, receiving low-latency information from only a subset of devices may be more useful than receiving 100% of the information with longer latency, during significant power outage and restoration events.

Phased Network Formation for Power Restoration

The techniques herein provide a mechanism for quickly reporting Power Restoration Notifications (PRNs) from a subset of devices in a multi-hop mesh network. In one aspect, the techniques involve splitting the network formation process into two phases whereby the first phase only forms a network for a subset of devices and the second phase allows the remaining device to join the network. In another aspect, suppression techniques are introduced that allow only a subset of the devices to participate in the network formation process during the first phase. In further aspects, closed-loop control mechanisms are introduced that allow a supervisory device (e.g., an OMS, etc.) to adjust the degree to which the join process is suppressed.

Illustratively, the techniques described herein may be performed by hardware, software, and/or firmware, such as in accordance with the network formation process 248/248a, which may include computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various PLC protocols or wireless communication protocols, and as such, may be processed by similar components understood in the art that execute those protocols, accordingly.

Specifically, according to various embodiments, a device receives a router advertisement message after a power outage event in a network. The device joins the network, in response to receiving the router advertisement message. The device sends a power restoration notification message via the network. The device selectively delays a disconnected node from joining the network.

Operationally, the techniques herein apply a two-phase approach to network formation. The first phase only selects a subset of devices to participate in network formation, effectively reducing density and allowing the selected subset to form a network and communicate their PRNs more quickly. Once the PRNs have been communicated, the remaining devices in the network may attempt to join the network. In various embodiments, the subset of devices that join the network during the first phase of network formation may use protocol parameters that are configured to work better when the network density is low. In particular, because only a subset of devices are participating in the network join process during this phase, parameters that govern random communication windows, retransmission delays, etc. may be reduced in the first phase to allow for quicker network formation. In the second phase, nodes may return to using their standard network formation techniques.

Figure 5A:
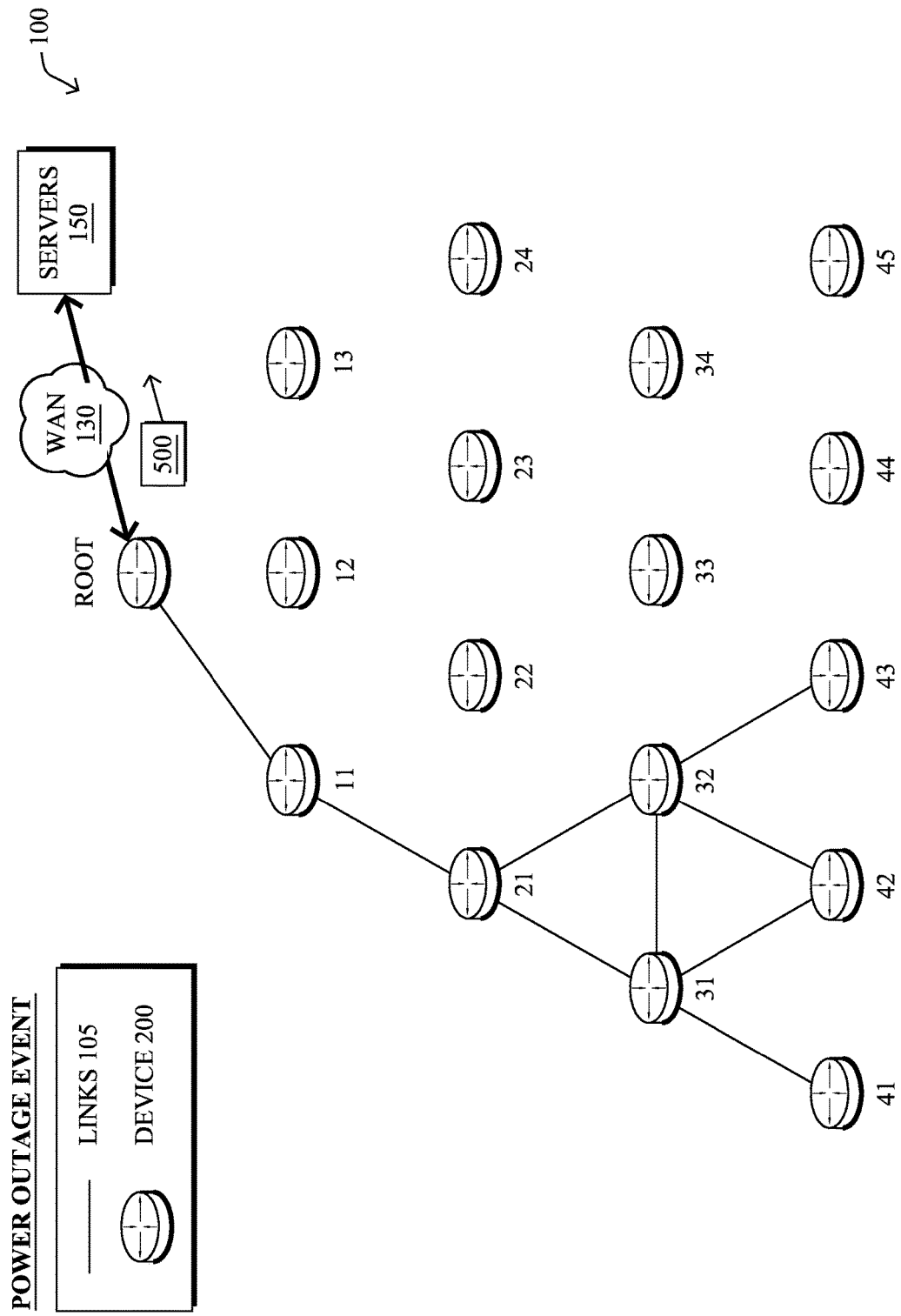
FIGS. 5A-5I illustrate an example of phased network restoration after a power outage event.

Referring now to FIGS. 5A-5I, an example of phased network restoration after a power outage event is shown, according to various embodiments. As shown in FIG. 5A, assume that a power outage event occurs in network 100, causing some or all of nodes 11-45 to lose power and/or connectivity to the network. As noted previously, in response to such an event, any node that detects the outage event send a power outage notification (PON) 500 to the OMS, to alert the OMS to the power outage. For example, as shown, the FAR/Root node may be equipped with a battery backup system or other redundant power source (e.g., a solar panel, etc.) that allows the FAR/Root to continue communicating during the power outage.

As noted previously, when a device rejoins the network, it typically generates a PRN and sends the PRN to the OMS. In various embodiments, only a subset of devices may rejoin the network during the first phase of network reformation. Doing so may reduce the amount of PRNs that are reported to the OMS. In addition, this may enable a quick network formation across multiple hops, by allowing the OMS to quickly determine whether a nested outage exists. Once the first phase is complete, the second phase may begin and allow the remaining network devices to join the network.

Figure 5B:
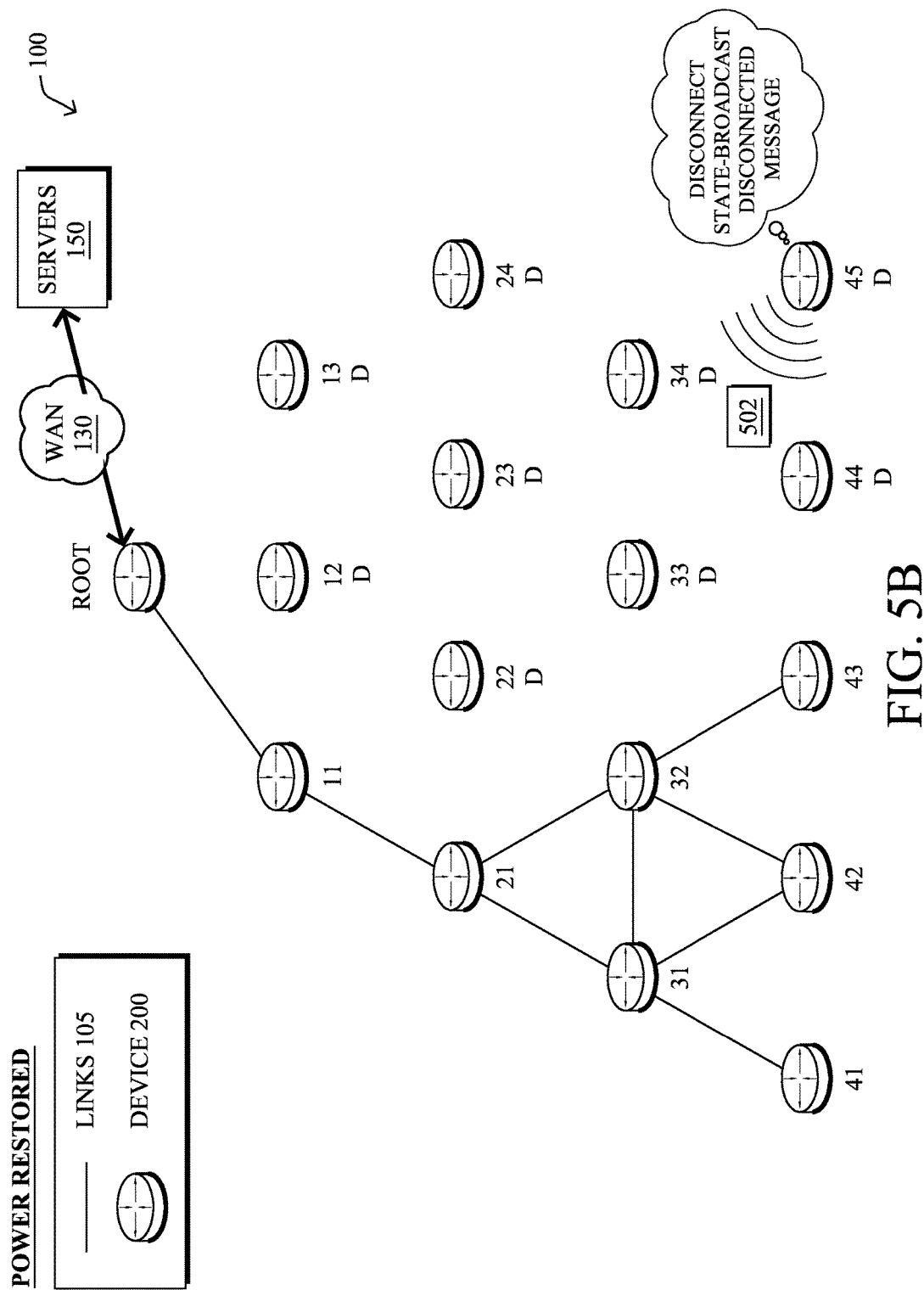

As shown in FIG. 5B, assume that power is restored to some or all of the nodes in network 100. Thus, any node that comes back online may attempt to rejoin network 100 and send a PRN to the OMS after rejoining the network. In various embodiments, the nodes may be configured to implement a self-forming process that allows only a subset of the devices in a dense mesh network to participate in the network formation process. In other words, the ability of some nodes to rejoin the network may be suppressed during the first phase of network reformation.

In one embodiment, all nodes that need to rejoin the network may initially be in a "Disconnected" state/mode of operation and periodically broadcast a disconnected message. For example, as shown, nodes 12-13, 22-24, 33-34, and 44-45 may be initialized to the Disconnected mode (denoted 'D' in the Figures), prior to rejoining the network. In this mode, the disconnected nodes may periodically broadcast disconnected messages 502, which may be received by any neighboring nodes that are within range of the broadcasting node.

Figure 5C:
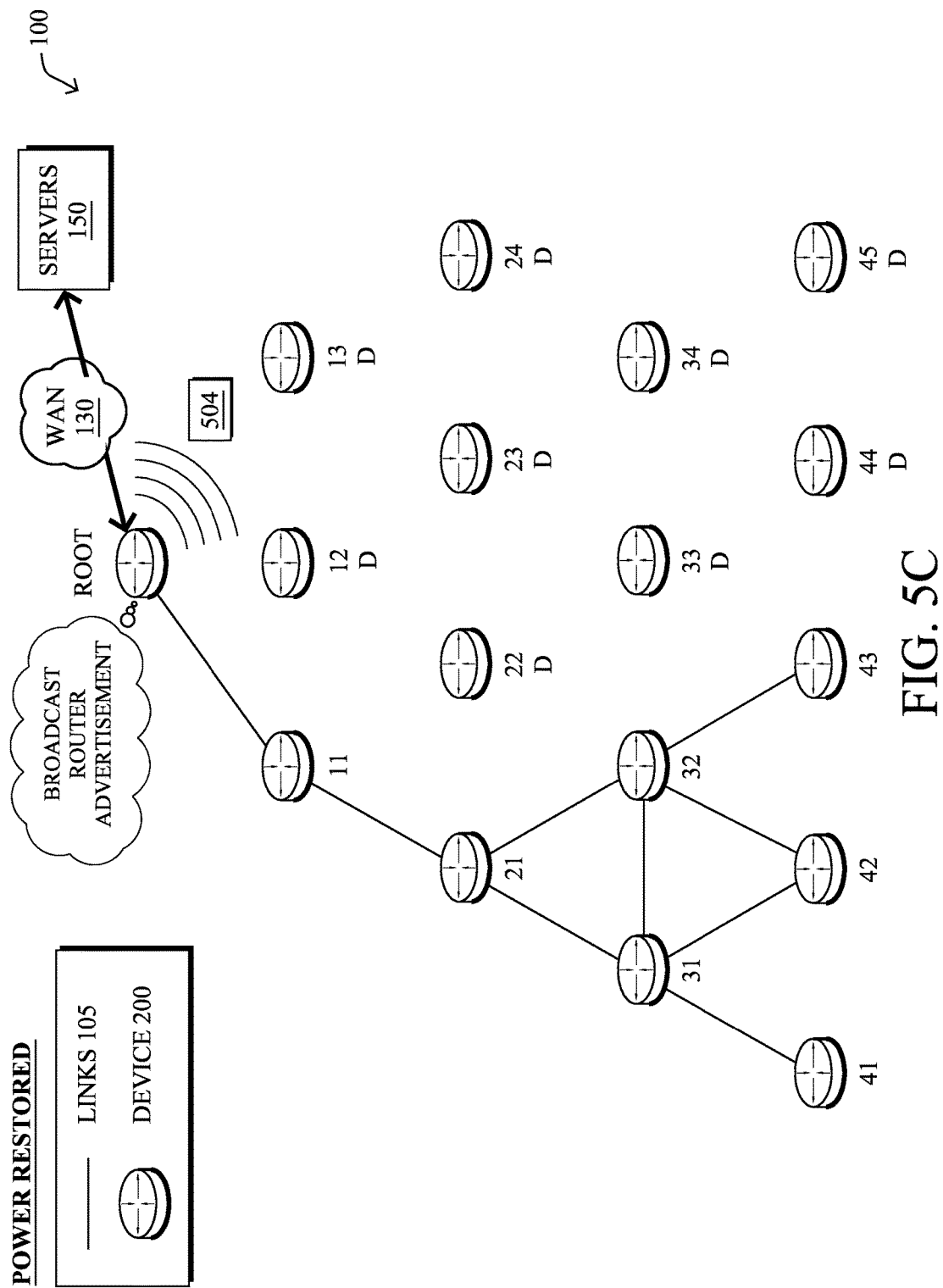

To initiate the quick network formation process, the FAR/Root node may also periodically broadcast a router advertisement message to any nodes that are within reception range. For example, as shown in FIG. 5C, the FAR/Root node may broadcast router advertisements 504 to any nodes that are within reception range of the FAR/Root.

Figure 5D:
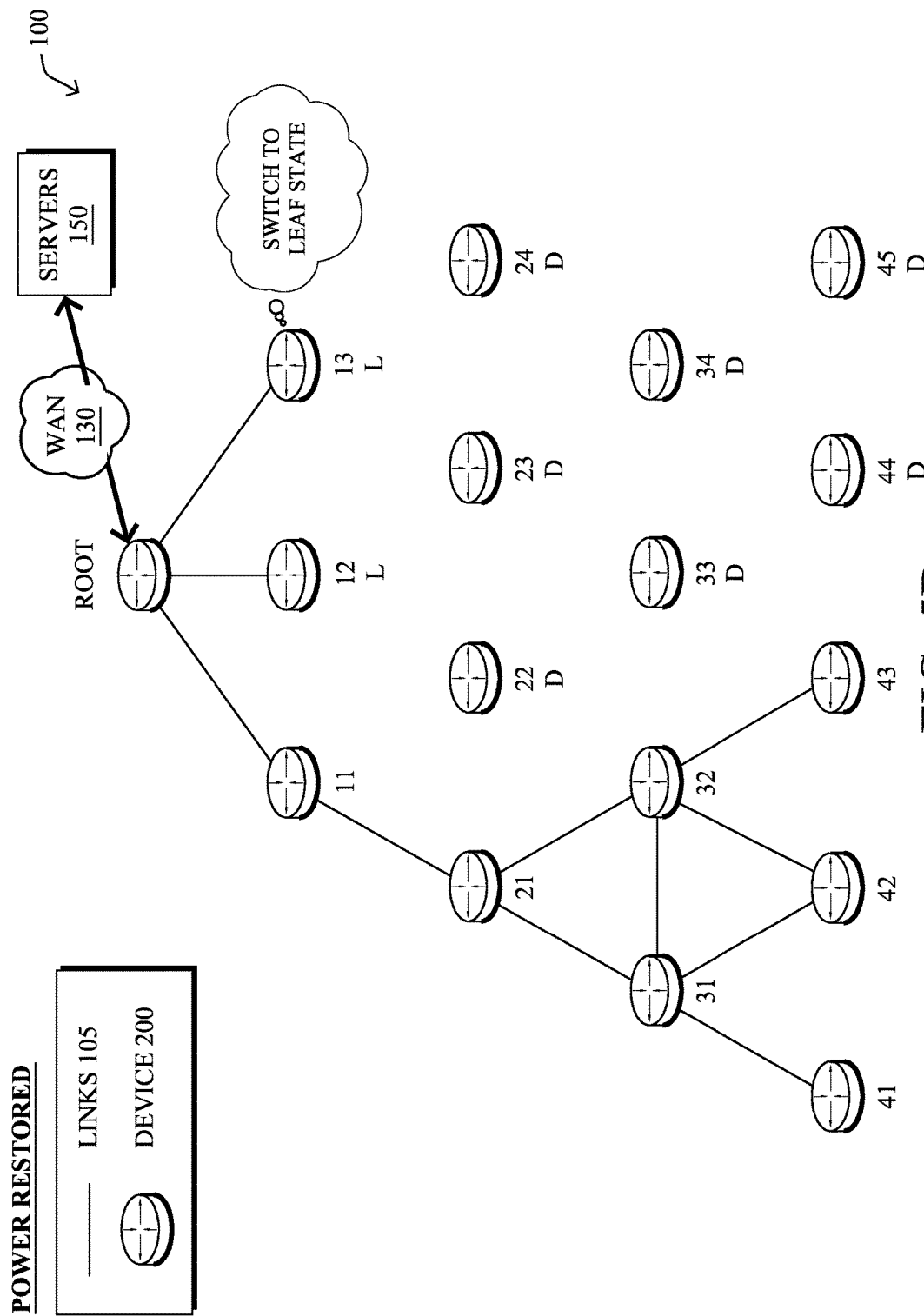

In some embodiments, a node that is in the Disconnected mode may transition to a "Leaf" state/mode of operation, in response to receiving a router advertisement message. For example, as shown in FIG. 5D assume that nodes 12-13 are within reception of the FAR/Root and receive the router advertisements 504 broadcast by the FAR/Root. In response, nodes 12-13 may enter into the Leaf mode (denoted L in the Figures) and rejoin the network. During this time, the joining nodes 12-13 may also provide PRN messages to the OMS via network 100. While in the Leaf mode, a node may also stop broadcasting disconnected messages. In one embodiment, a node may rejoin the network and enter the Leaf State only after receiving router advertisements from a threshold number of routers. Notably, this threshold may be a configurable parameter, thereby allowing the OMS, FAR/Root, or other supervisory to further control the amount of redundancy offered by the reformed network.

Figure 5E:
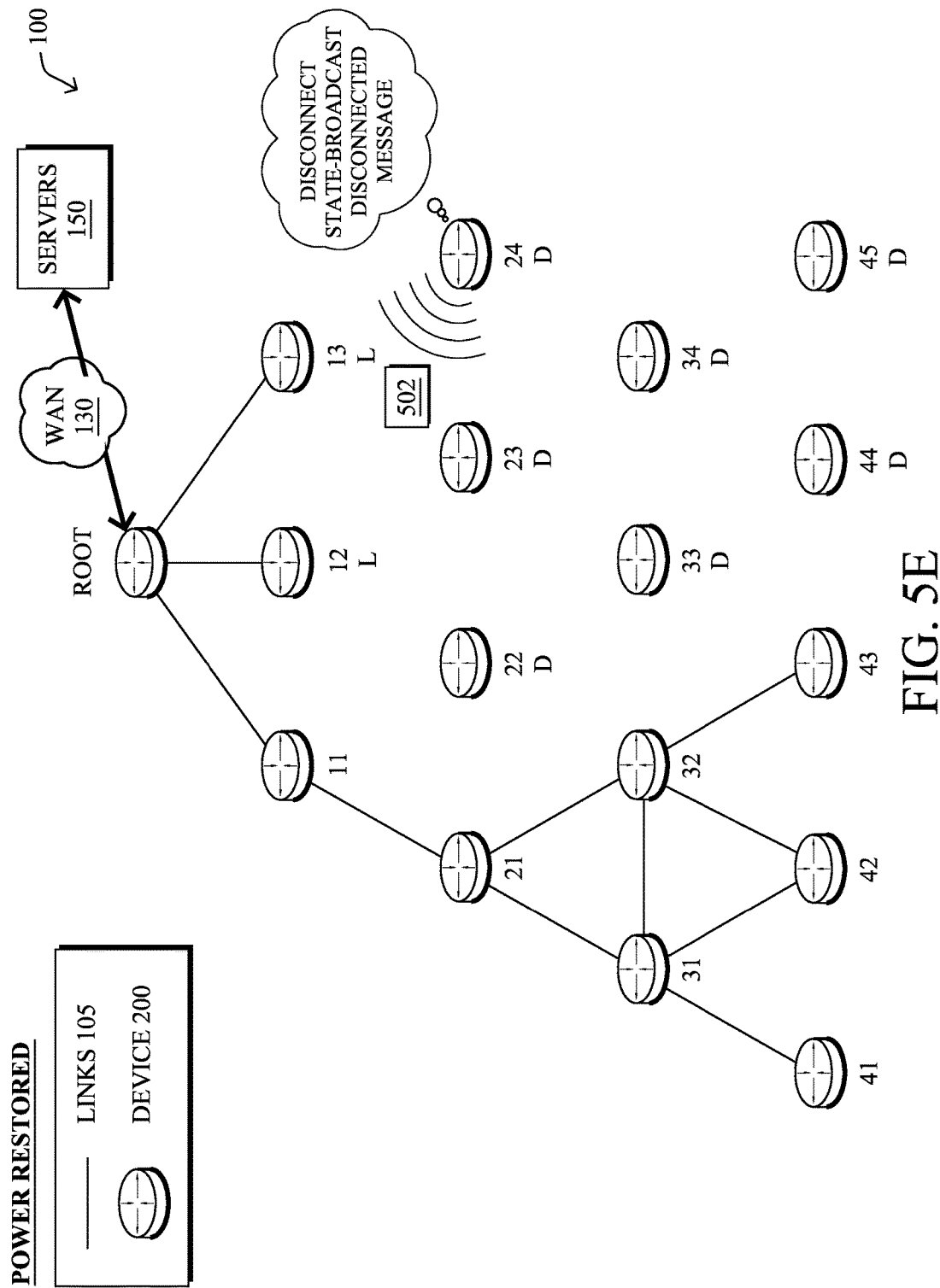

In the case where all nodes are within one hop of the FAR/Root, all devices transition to the Leaf mode, stop broadcasting, and the network formation process is complete. In the case where there are nodes multiple hops away from the FAR/Root, nodes within one hop of the FAR will be in the Leaf mode and nodes multiple hops away will still be in the Disconnected mode. For example, as shown in the example of FIG. 5E, nodes 22-24, 33-34, and 44-45 may still be in the Disconnected mode and continue to broadcast disconnected messages 502 periodically.

Figure 5F:
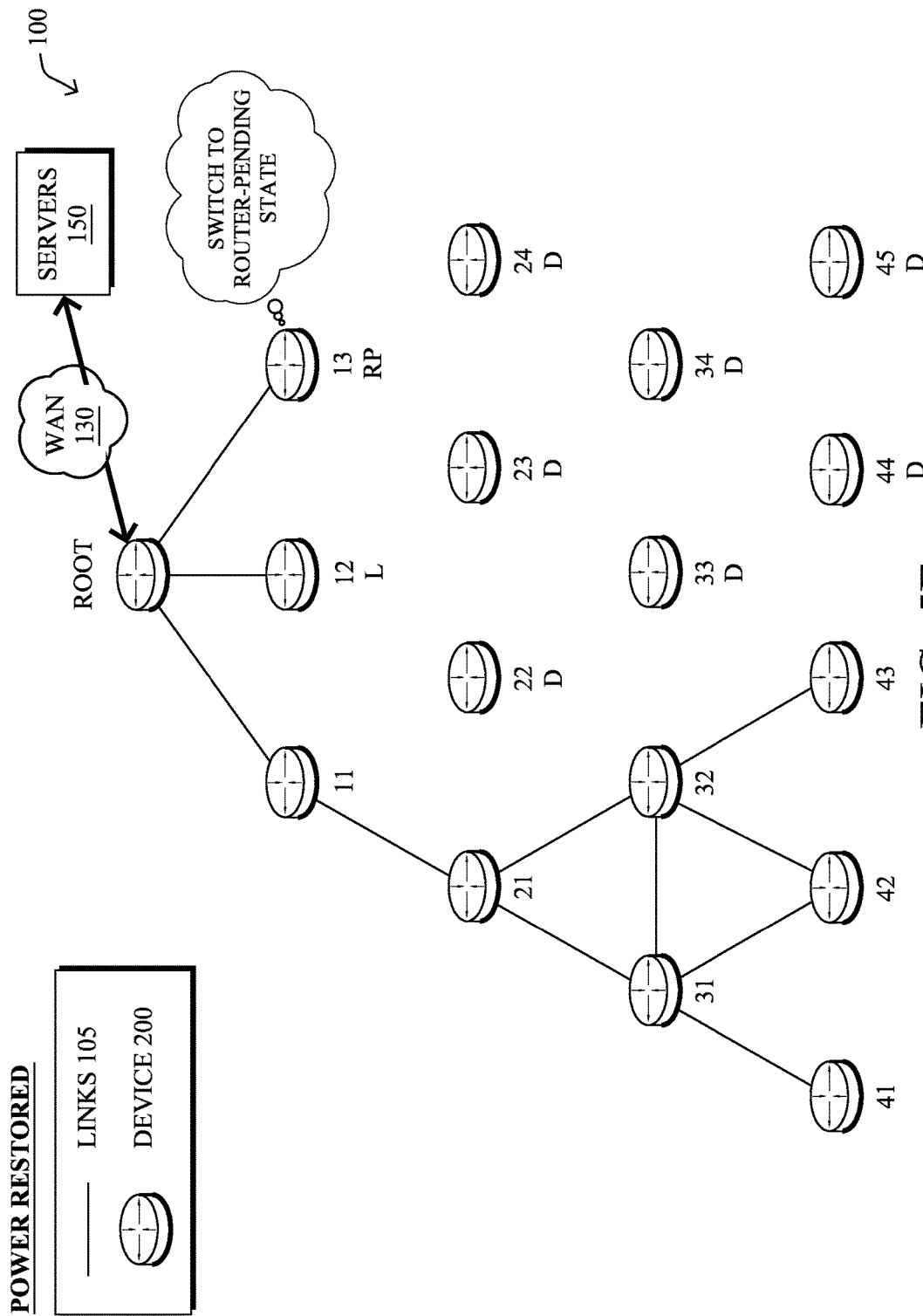

When a node in the Leaf mode receives a disconnected message, it may transition to a "Router Pending" state/mode of operation and start a timer. For example, as shown in FIG. 5F, node 13 may enter into the Router Pending mode (denoted 'RP' in the Figures) and start an internal timer. In various embodiments, the timer started by a node entering into the Router Pending mode may be randomly selected by the node. For example, node 13 may choose a random time delay within a configurable time range. Similar to the transition to the Leaf State, a node may only enter into the Router Pending mode after receiving disconnected messages from a threshold number of disconnected nodes, in some embodiments, thereby allowing the OMS or other supervisory device to further adjust the network formation process.

Figure 5G:
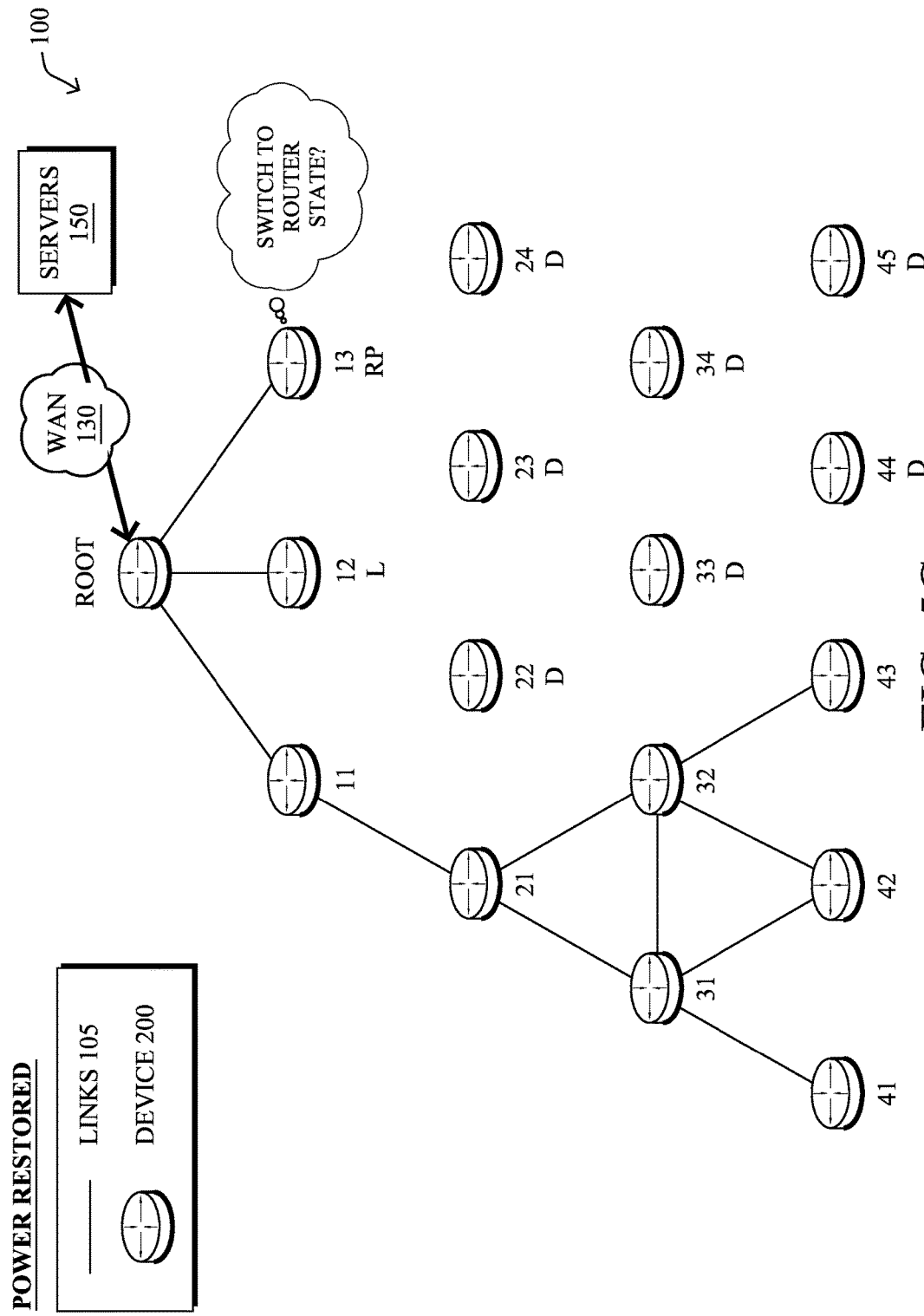

After a node in the Router Pending mode sets its timer, the node may determine whether to enter into a further "Router" state/mode of operation. For example, as shown in FIG. 5G, node 13 may determine whether to enter into the Router mode. In one embodiment, if a node in the Router Pending mode receives a router advertisement from a new node (e.g., node 12, etc.) before its timer expires, the node may transition back to the Leaf mode. In general, a router advertisement may advertise the presence of the network to any disconnected nodes within range of the advertising node. However, if the timer expires, before the node in the Router Pending mode receives such a router advertisement, the node may transition to the Router mode.

Figure 5H:
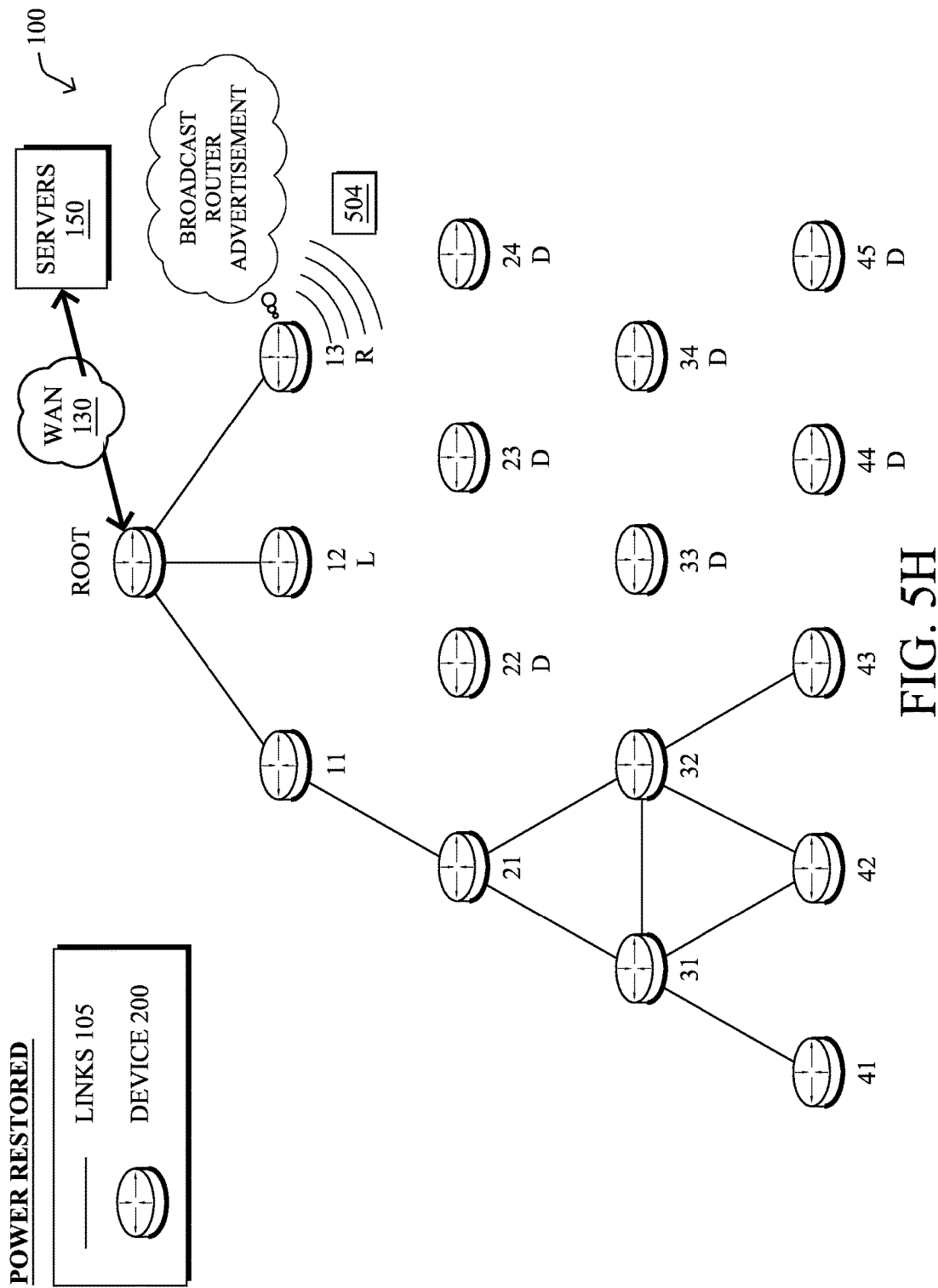
Figure 5I:
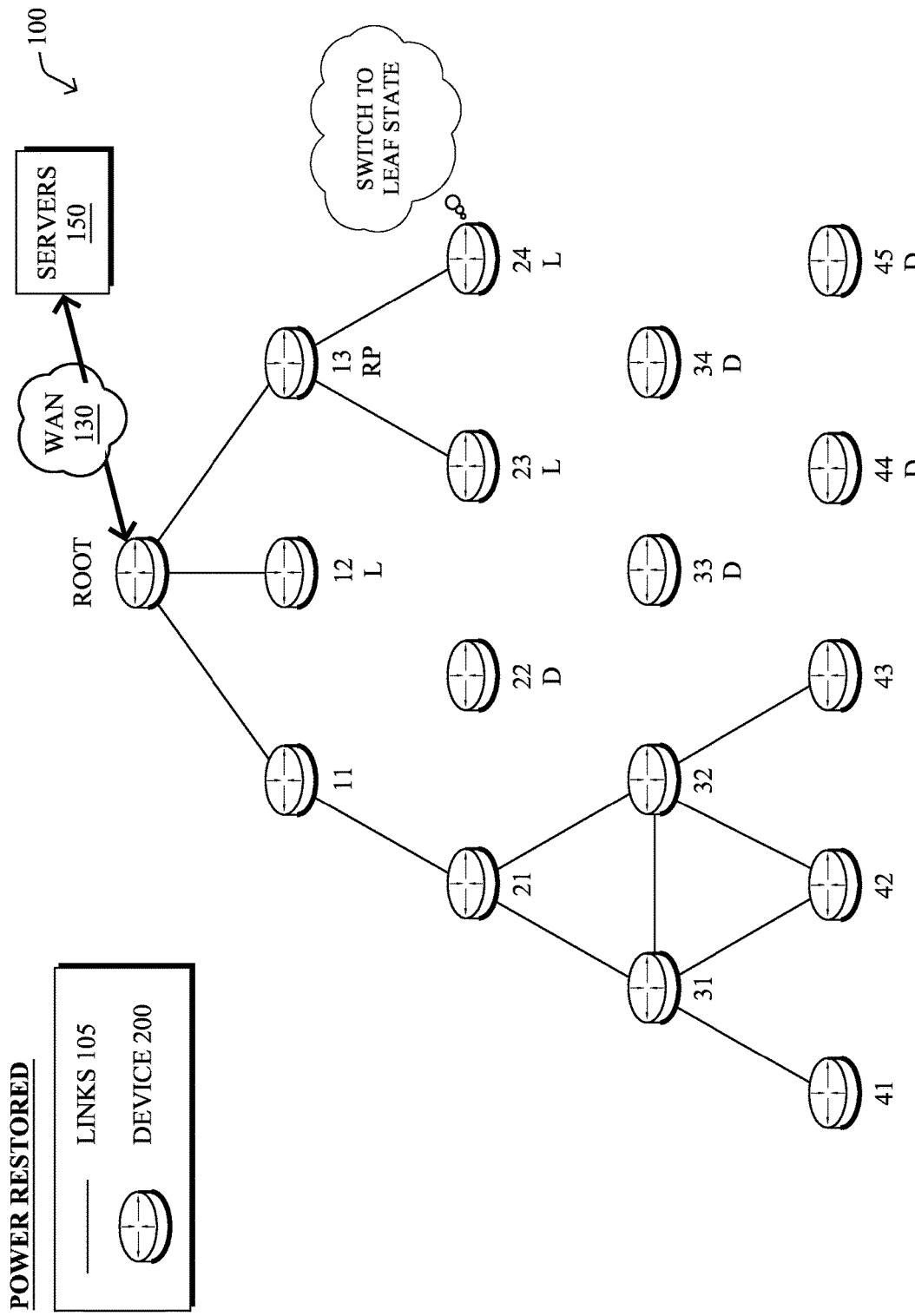

In various embodiments, a node that enters into Router mode may begin broadcasting router advertisements periodically. For example, as shown in FIG. 5H, assume that node 13 has entered into the Router mode (denoted "R" in the Figures). In such a case, node 13 may periodically or randomly broadcast router advertisements 504 to any neighboring nodes in range. Thus, node 13 may announce the presence of network 100 to any disconnected nodes that have not yet joined the network and are within range of node 13 (e.g., node 23, node 24, etc.). In response to receiving router advertisements 504 from node 13, nodes 23-24 may rejoin network 100 and transition to the Leaf mode, as shown in FIG. 5I. On rejoining network 100, nodes 23-24 may also send PRNs to OMS (e.g., one of servers 150).

In implementations in which nodes in the Router Pending mode set timers randomly before entering into the Router mode, this means that only the node having the shortest time delay will become a router that allows a disconnected node to rejoin the network by sending out router advertisements. This also has the effect of suppressing router advertisements from the nodes in the Router Pending mode that have longer time delays, by forcing these nodes back into the Leaf mode of operation. Notably, while in the Leaf mode, a node does not send router advertisements.

Intuitively, the above techniques enable a process whereby nodes transmit messages in search for connectivity with a router (e.g., a FAR/Root node). Once connectivity is achieved, nodes suppress themselves unless a neighboring device continues to search for connectivity (e.g., until the neighboring device begins broadcasting disconnected messages). When additional connectivity is needed, a subset of devices elects themselves to become routers by switching over to the Router mode of operation.

A number of additional mechanisms may be used to make the phased network reformation process more robust. For example, one such mechanism may be to use adaptive timer periods to help ensure message exchanges between inconsistent nodes. In another embodiment, nodes may be configured to suppress the transmission of disconnected messages. In a further embodiment, nodes may be required to perform a data/acknowledgement (ACK) exchange to verify bi-directional connectivity, before the disconnected node rejoins the network. In yet further embodiments, as discussed above, a node may be required to receive router advertisements from K>1 routers before transitioning into the Leaf mode and/or from J>1 routers before transitioning into the Router Pending mode, to provide greater redundancy in the reformed network. Since the techniques herein operate by using a random timer mechanism, the techniques herein may be adapted for use with RPL, which uses a similar mechanism for DIO messages.

Figure 6A:
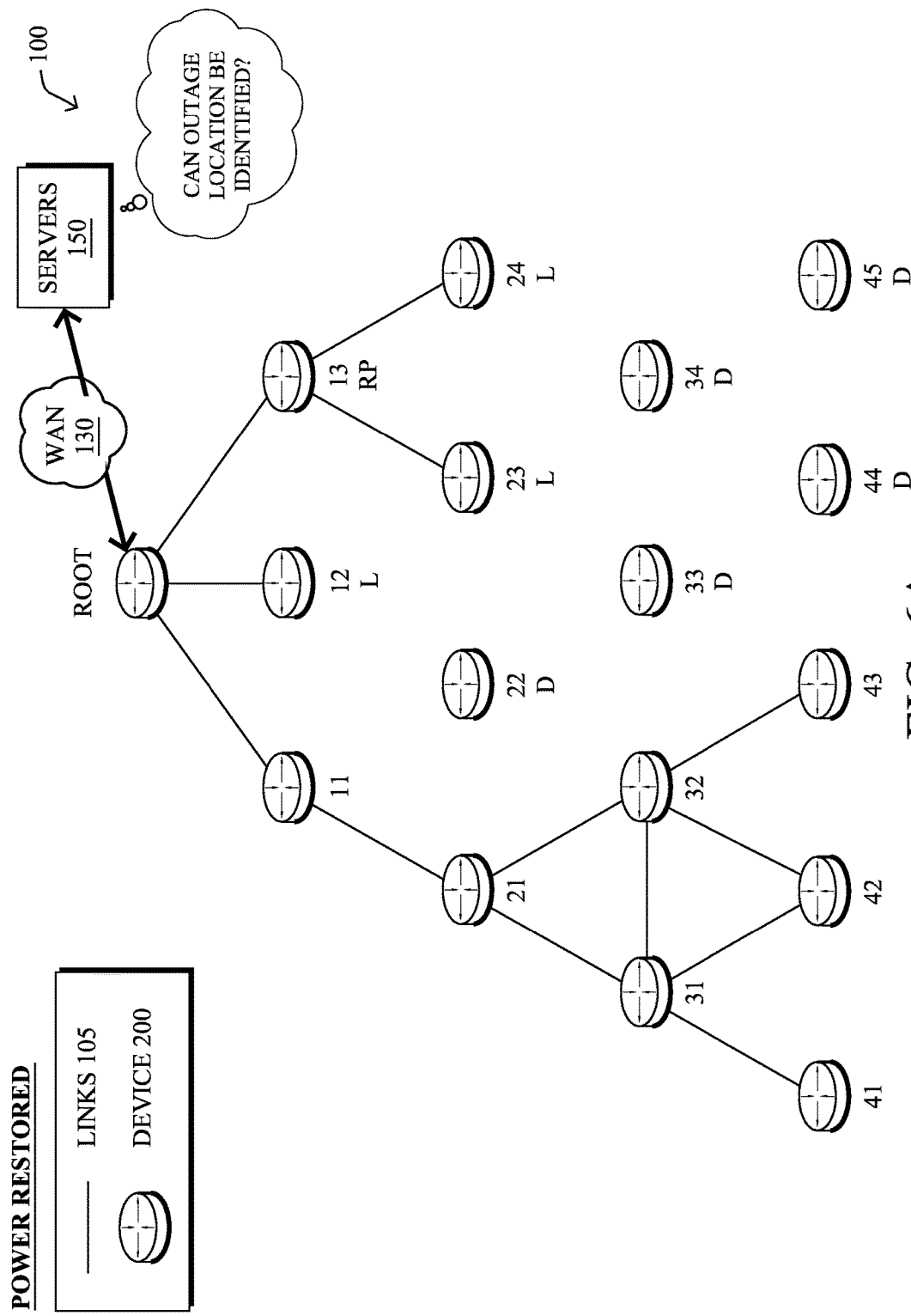
FIGS. 6A-6C illustrate examples of a phased network restoration mechanism being adjusted.
Figure 6B:
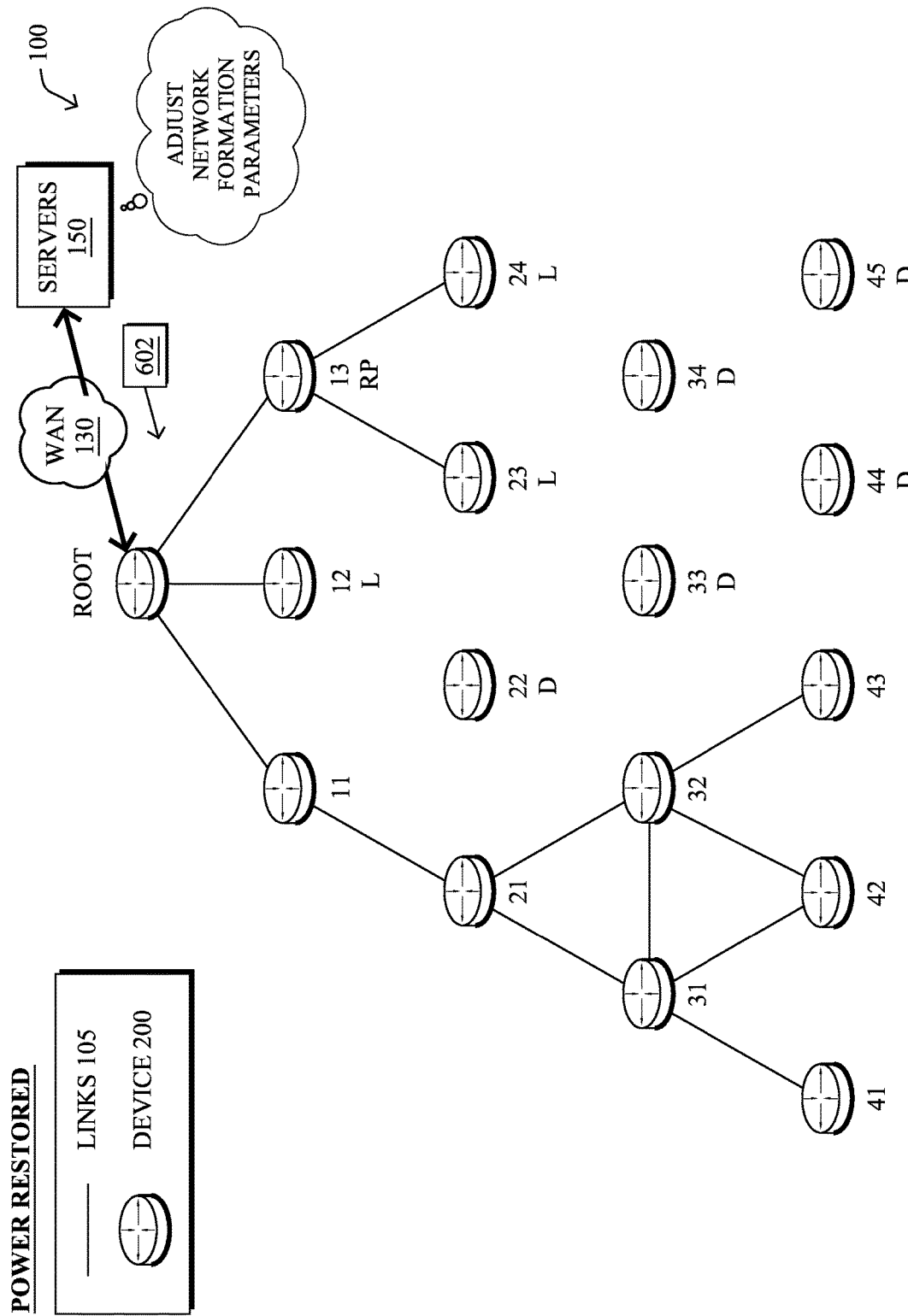
Figure 6C:
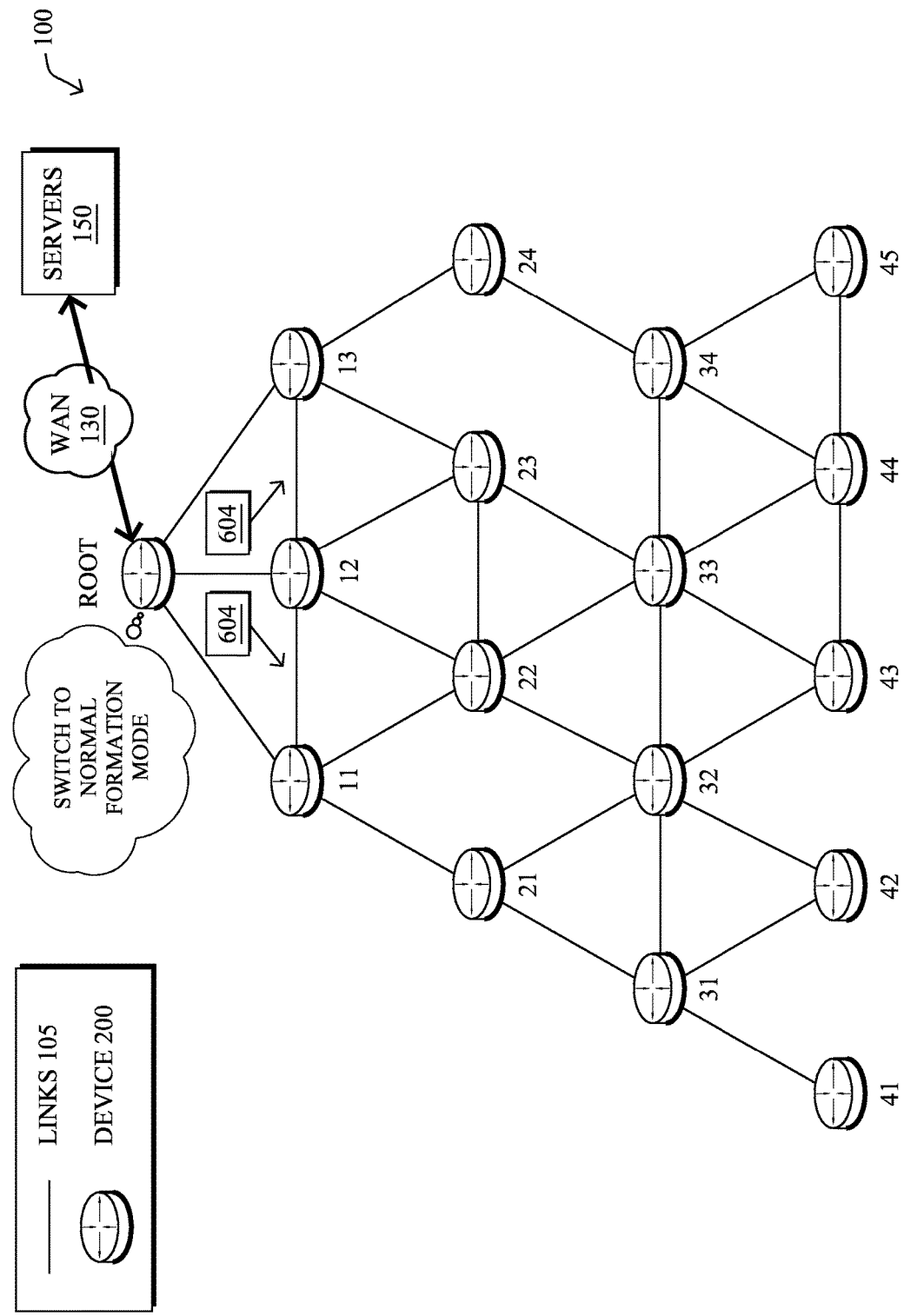

FIGS. 6A-6C illustrate examples of a phased network restoration mechanism being adjusted, according to various embodiments. In particular, the network may use a closed-loop control mechanism with the OMS, to control the density of the resulting set of connected nodes. In particular, a control loop mechanism may be implemented between the OMS and the FAR/Root node, to search for the optimal set of (re)connected nodes using potentially random search processes. For example, as shown in FIG. 6A, the OMS may determine whether it has sufficient information from the (re)joined nodes to pinpoint the location of a power outage. If the OMS has more information than needed to pinpoint the location, it may adjust parameters to reduce the density of the set of nodes. On the other hand, if the OMS does not have enough information to pinpoint the location of an outage, it may adjust parameters used by the network formation process to increase the density of the joined nodes. For example, as shown in FIG. 6B, the OMS may send an instruction 602 to the FAR/Root that adjusts one or more parameters used by the nodes during network reformation. In some cases, the OMS may adjust redundancy threshold parameters that control when a node enters into the Leaf or Router modes (e.g., the number of nodes from which the node received router advertisements, etc.). In another embodiment, the OMS may adjust the transmit power/RSSI threshold used by the nodes, to limit the range of radio transmissions sent by a given node.

At some point in time after power is restored, a supervisory device (e.g., the FAR/Root, the OMS, etc.), may switch the network over to the second phase in which nodes may join the network normally. For example, as shown in FIG. 6C, the Far/Root node may disseminate instructions 604 into the mesh that cause the nodes to switch from the first phase to the second phase. In various embodiments, instructions 604 may be piggybacked onto existing protocol messages (e.g., as a set flag, etc.). Conditions that trigger the switchover may include the FAR/Root receiving a command (e.g., from the OMS, etc.) that indicates that the power restoration mode is over, based on an observed rate of PRNs dropping to zero or near zero, etc. In effect, a first sparse tree may be formed to allow the OMS to randomly explore an outage zone during a power recovery phase. This creates a sample of the nodes that are recovering from a power outage condition, which may be used by the OMS/utility to determine whether the rest of the network is also likely powered and that it is safe to restart the entire network.

Figure 7:
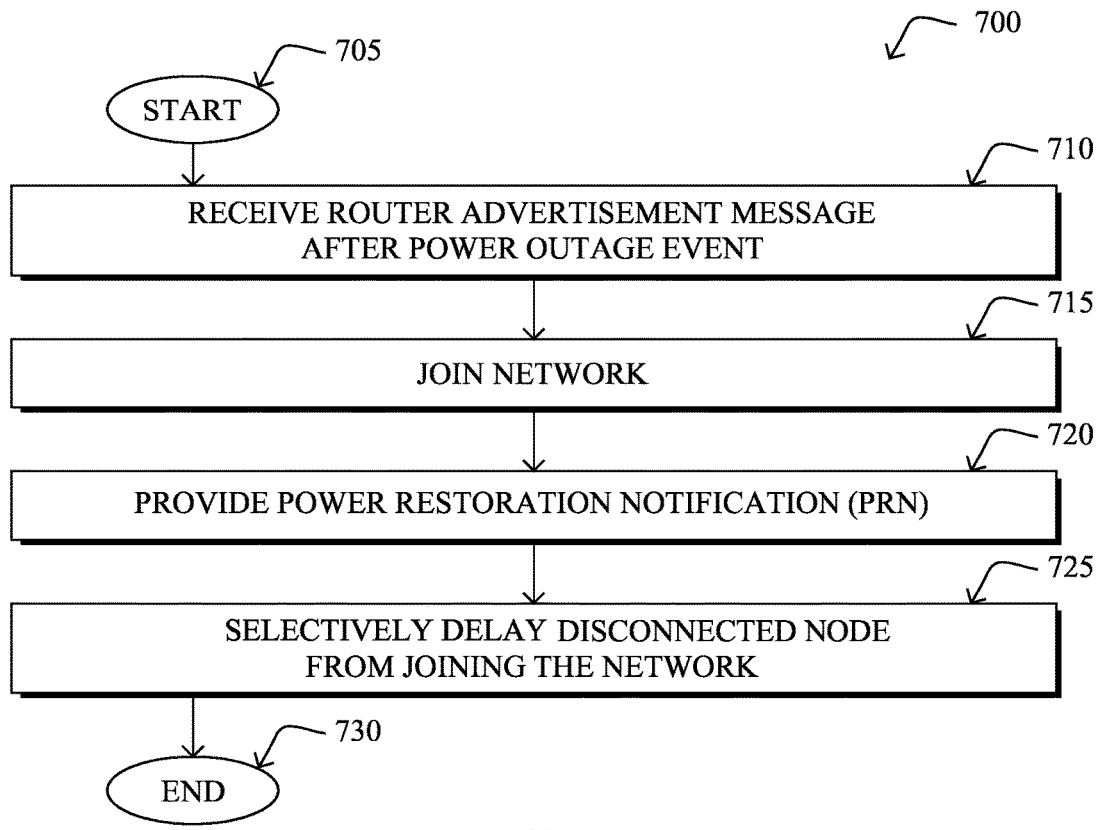
FIG. 7 illustrates an example simplified procedure for selectively delaying a disconnected node from joining a network.

Referring now to FIG. 7, an example simplified procedure for selectively delaying a disconnected node from joining a network is shown, in accordance with various embodiments herein. Procedure 700 may be performed by any network device (e.g., device 200) configured to restore connectivity to a network after a power outage event. Procedure 700 may begin at a step 705 and continue on to step 710 where, as described in greater detail above, a device receives a router advertisement after the power outage event. In general, such an advertisement may be viewed as an invitation for the device to join the network and route traffic through the node that sent the router advertisement.

At step 715, the device joins the network, in response to receiving the router advertisement, as described in greater detail above. In particular, the device may establish a network connection to the node that sent the router advertisement.

At step 720, the device provides a power restoration notification (PRN) message via the network, as detailed above. For example, after joining the network, the device may notify an OMS or other supervisory device that its power has been restored. This information may be used by the OMS for purposes of determining whether power has been restored to the entire network, to detect nested power outages, to prevent unnecessary deployments of repair technicians, and the like.

At step 725, as described in greater detail above, the device selectively delays a disconnected neighbor node from rejoining the network. In various embodiments, if the network is a first phase of network reformation, the device may rejoin the network in a state that forces the node to remain a leaf node for a period of time. In other words, the device may not act as a router immediately after rejoining the network. While in the leaf state, the device may not send router advertisements to allow any of its disconnected neighbor nodes to rejoin the network. Even if the device later transitions to a router state, the device may further delay a neighbor from joining the network (e.g., by purposely lowering the transmission power that the device uses to send router advertisements, etc.). At some point in time, the network may transition to a second phase of network reformation that allows any remaining disconnected nodes to rejoin the network (e.g., by allowing the device to stop delaying its disconnected nodes from joining). Procedure 700 then ends at step 730.

Figure 8:
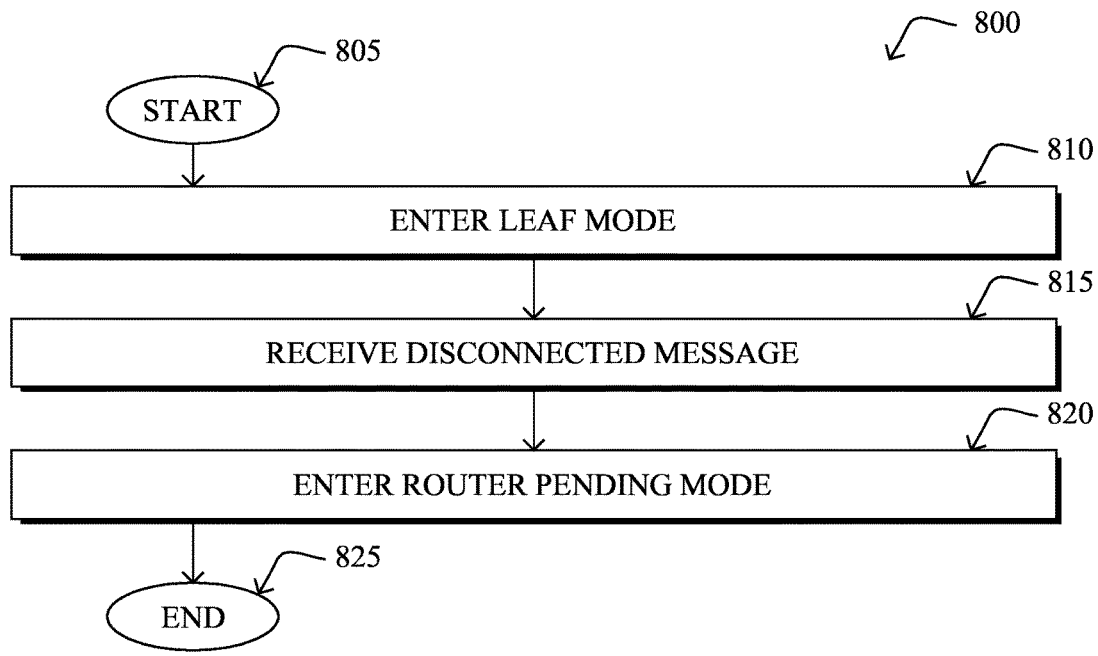
FIG. 8 illustrates an example simplified procedure for entering a router pending mode of operation.

FIG. 8 illustrates an example simplified procedure for entering a router pending mode of operation, in accordance with various embodiments herein. Procedure 800 may begin at a step 805 and continue on to step 810 where, as described in greater detail above, a device enters into a leaf mode of operation. For example, the device may enter into the leaf mode of operation, in response to receiving one or more router advertisements from another node that is connected to the network. Notably, the device may enter the leaf mode in conjunction with the device rejoining the network via the sender of a router advertisement. In general, while in the leaf mode, the device may purposely remain a leaf in the current network tree of connected nodes. Said differently, the device may not facilitate any of its disconnected neighbors rejoining the network (e.g., by broadcasting router advertisements, etc.).

At step 815, the device receives a disconnected message from a neighboring node that has not yet joined the network, as detailed above. In some implementations, any node that is operational but has not yet joined the network may periodically broadcast a disconnected message. Thus, the device may be notified that it has one or more neighbors that are not yet members of the network.

At step 820, as described in greater detail above, the device enters into a router pending mode of operation. In various embodiments, the device may enter the router pending mode in response to receiving a single disconnected message or, alternatively, disconnected messages from a threshold number of disconnected neighbors. In general, the device may continue to operate as a leaf in the network while in the router pending mode, thereby delaying the disconnected neighbor(s) from joining the network (e.g., by not broadcasting router advertisements). However, when in the router pending mode, the device may now have the potential to transition to being a router, provided certain conditions are met. If those conditions are not met, the device may alternatively return to the leaf mode of operation. Procedure 800 the ends at step 825.

Figure 9:
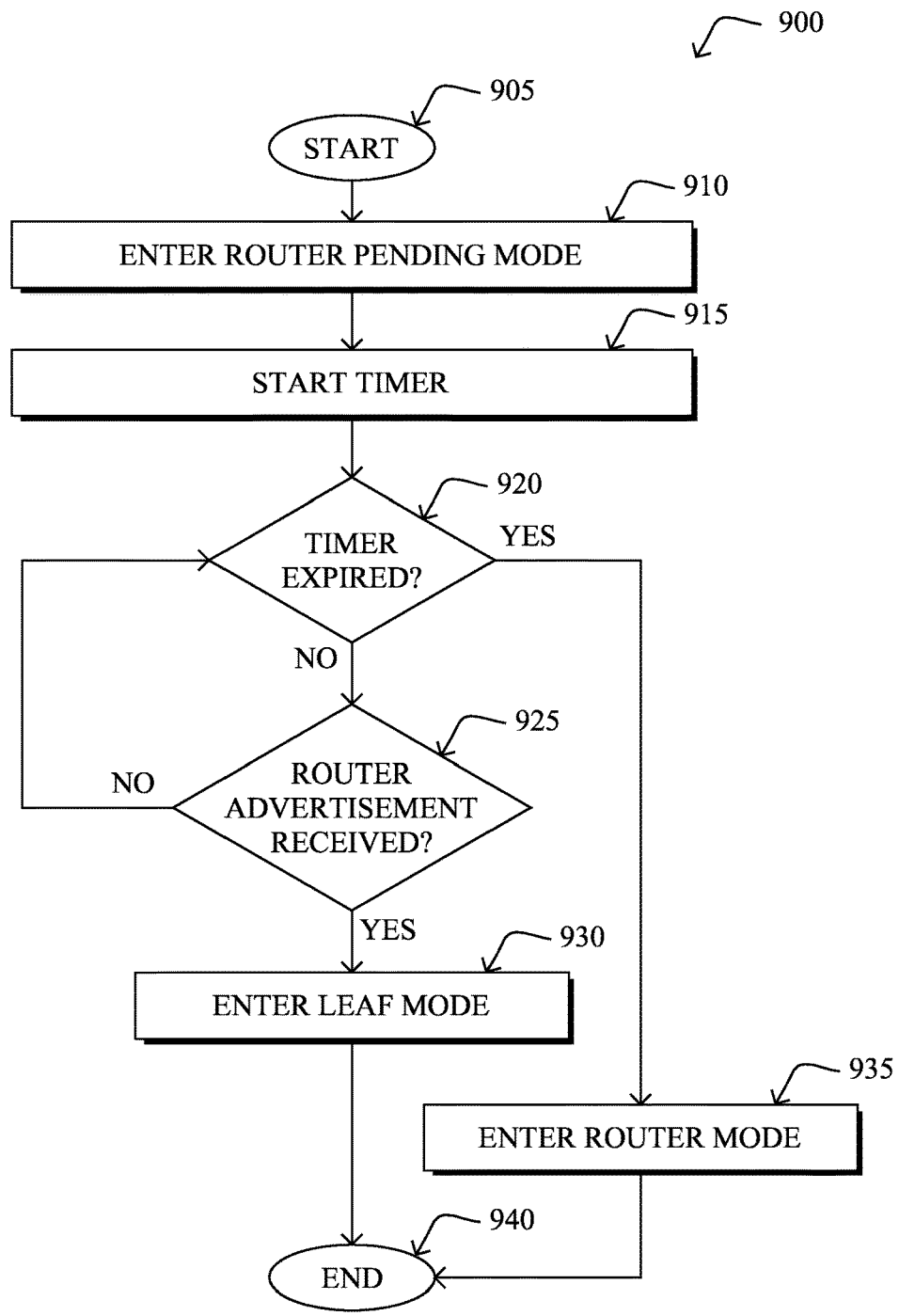
FIG. 9 illustrates an example simplified procedure for operating in a router pending mode of operation.

FIG. 9 illustrates an example simplified procedure for operating in a router pending mode of operation, in accordance with various embodiments herein. Procedure 900 may begin at a step 905 and continue on to step 910 where, as described in greater detail above, a device enters into a router pending mode of operation. In general, the device may be operable only to function as a leaf in the network, preventing any disconnected neighbors from joining the network via the device. In various embodiments, the device may enter into the router pending mode, in response to receiving one or more disconnected messages from any disconnected neighbors of the device.

At step 915, as detailed above, the device begins a timer, upon entering the router pending mode. In various embodiments, the duration of the timer may be randomly chosen. For example, the device may randomly select the duration of the timer from among a set of values that correspond to a range of time, up to a maximum duration.

At decision step 920, the device determines whether the timer has expired, as described in greater detail above. If the timer has not expired, procedure 900 continues on to decision step 925 where the device determine whether it has received a router advertisement from a new node (e.g., a node that has previously not sent a router advertisement to the device) or, alternatively, from a threshold number of new nodes. If not, procedure 900 returns to step 920. However, if so, procedure 900 continues on to step 930.

At step 930, as described in greater detail above, the device (re)enters into a leaf mode. In other words, the device may end the timer prematurely and continue to act as a leaf in the network (e.g., by performing process 800). Procedure 900 then ends at step 940.

If, at decision step 920, the device determines that the timer has expired and the condition of decision step 925 has not been met (e.g., the device has not receive the requisite router advertisements from new nodes), the device enters into a router mode of operation at step 935. As noted above, when in the router mode, the device is now able to route traffic from any of its neighbors, thereby allowing any disconnected neighbors to join the network and begin sending traffic. Procedure 900 then continues on to step 940 and ends.

Figure 10:
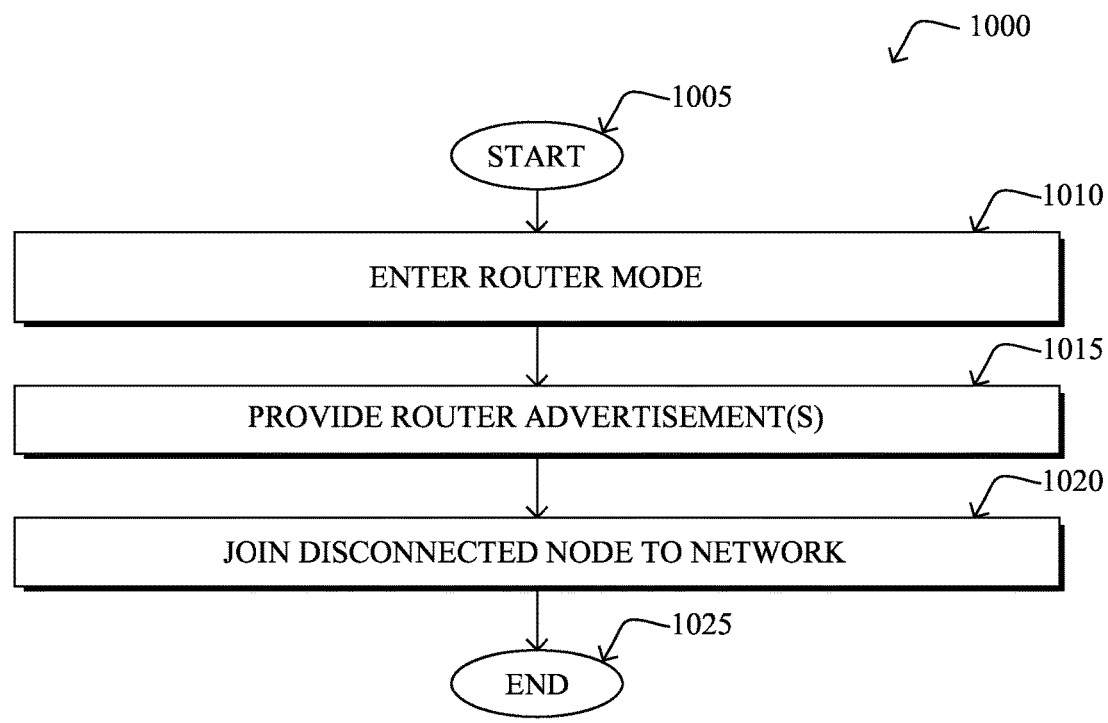
FIG. 10 illustrates an example simplified procedure for operating in a router mode of operation.

FIG. 10 illustrates an example simplified procedure for operating in a router mode of operation, in accordance with one or more embodiments herein. Procedure 1000 may begin at step 1005 and continue on to step 1010 where, as described in greater detail above, a device enters into a router mode of operation. As noted above, the router mode of operation may allow the device to forward traffic to/from any child nodes of the router. During network formation, this may also correspond to the device facilitating any of its disconnected neighbors joining the network.

At step 1015, the device broadcasts one or more router advertisement(s) to the nodes that are in range of the device, as described in greater detail above. Generally, the router advertisement signifies the device's ability to act as a router for any of its neighbors that are in range of the device.

At step 1020, as detailed above, the device may join one or more of its disconnected neighbor nodes to the network. For example, in response to the device advertising its ability to function as a router, a disconnected neighbor may opt to join the network by using the device to receive and/or send traffic to/from the network. Procedure 1000 then ends at step 1025.

It should be noted that while certain steps within procedures 700-1000 may be optional as described above, the steps shown in FIGS. 7-10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-1000 are described separately, certain steps from each procedure may be incorporated into each other procedure, and the procedures are not meant to be mutually exclusive.

The techniques described herein, therefore, provide for mechanisms that allow utilities to quickly determine whether nested outages exist after a power restoration event. Initially performing network formation on a subset of devices effectively reduces the network density and allows the network to form across multiple hops more quickly. Because the OMS can easily deal with only a small subset of information, having only a subset of devices report PRNs is an effective and desirable solution for utilities.

While there have been shown and described illustrative embodiments that provide for network formation, it is to be understood that various other adaptations and modifications may be made within the spirit and scope of the embodiments herein. For example, the embodiments have been shown and described herein with relation to PLC networks. However, the embodiments in their broader sense are not as limited, and may, in fact, be used with other types of shared-media networks and/or protocols (e.g., wireless). In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
providing, by a device in a Directed Acyclic Graph (DAG) network, a first instruction to a first node in the network that causes the first node to selectively delay a disconnected node from joining the network by entering the first node into a leaf mode of operation, in response to the first node receiving the first instruction from the device, wherein the first node is configured to prevent advertising a presence of the network to the disconnected node while the first node is in the leaf mode of operation, wherein the first instruction comprises a threshold number of router advertisement messages that the first node must receive before joining the network or advertising a presence of the network to the disconnected node;
determining, by the device, whether formation of the network should continue being delayed; and
providing, by the device, a second instruction to the first node that causes the first node to stop delaying the disconnected node from joining the network, based on a determination that formation of the network should no longer be delayed.

2. The method as in claim 1, wherein the first instruction causes the first node to adjust an amount of power used by the first node to advertise a presence of the network to the disconnected node.

3. The method as in claim 1, wherein determining whether formation of the network should continue being delayed comprises:
determining, by the device, whether a location of a power outage can be identified.

4. An apparatus, comprising:
one or more network interfaces to communicate with a Directed Acyclic Graph (DAG) network;
a processor coupled to the one or more network interfaces and configured to execute a process; and
a memory configured to store the process executable by the processor, the process when executed operable to:
provide a first instruction to a first node in the network that causes the first node to selectively delay a disconnected node from joining the network by entering the first node into a leaf mode of operation, in response to the first node receiving the first instruction from the device, wherein the first node is configured to prevent advertising a presence of the network to the disconnected node while the first node is in the leaf mode of operation, wherein the first instruction comprises a threshold number of router advertisement messages that the first node must receive before joining the network or advertising a presence of the network to the disconnected node;
determine whether formation of the network should continue being delayed; and
provide a second instruction to the first node that causes the first node to stop delaying the disconnected node from joining the network, based on a determination that formation of the network should no longer be delayed.

5. The apparatus as in claim 4, wherein the first instruction causes the first node to adjust an amount of power used by the first node to advertise a presence of the network to the disconnected node.

6. The apparatus as in claim 4, wherein the apparatus determines whether formation of the network should continue being delayed by:
   determining whether a location of a power outage can be identified.

7. A tangible, non-transitory, computer-readable media having software encoded thereon, the software when executed by a processor of a device operable to:
   provide a first instruction to a first node in a Directed Acyclic Graph (DAG) network that causes the first node to selectively delay a disconnected node from joining the network by entering the first node into a leaf mode of operation, in response to the first node receiving the first instruction from the device, wherein the first node is configured to prevent advertising a presence of the network to the disconnected node while the first node is in the leaf mode of operation, wherein the first instruction comprises a threshold number of router advertisement messages that the first node must receive before joining the network or advertising a presence of the network to the disconnected node;
   determine whether formation of the network should continue being delayed; and
   provide a second instruction to the first node that causes the first node to stop delaying the disconnected node from joining the network, based on a determination that formation of the network should no longer be delayed.

8. The apparatus as in claim 7, wherein the first instruction causes the first node to adjust an amount of power used by the first node to advertise a presence of the network to the disconnected node.

9. The apparatus as in claim 7, wherein the apparatus determines whether formation of the network should continue being delayed by:
   determining whether a location of a power outage can be identified.

* * * * *